F. BATEMAN.
FURROW COVERING MACHINE.
APPLICATION FILED FEB. 8, 1908.
999,005.
Patented July 25, 1911.
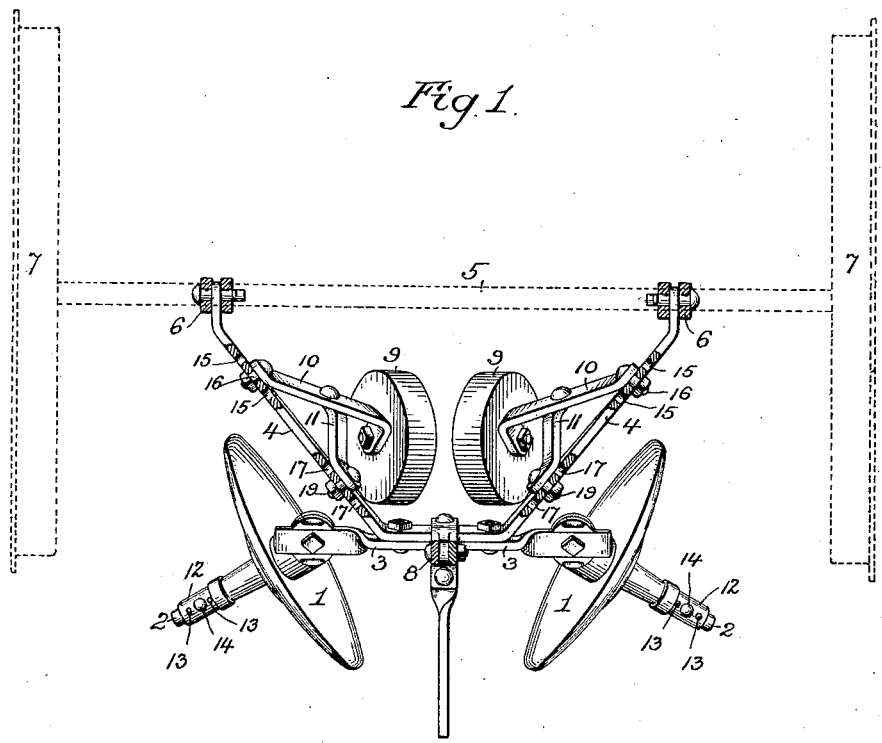
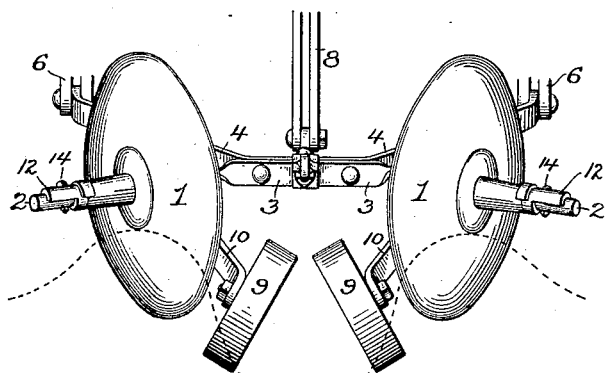
Witnesses
Hamilton D. Turner
Harry L. Smith
Inventor
Frank Bateman
by his Attorneys
Smith & Frazier

UNITED STATES PATENT OFFICE.

FRANK BATEMAN, OF GRENLOCH, NEW JERSEY, ASSIGNOR TO BATEMAN MANUFACTURING COMPANY, OF GRENLOCH, NEW JERSEY, A CORPORATION OF NEW JERSEY.

FURROW-COVERING MACHINE.

999,005. Specification of Letters Patent. Patented July 25, 1911.

Application filed February 8, 1908. Serial No. 414,920.

*To all whom it may concern:*

Be it known that I, FRANK BATEMAN, a citizen of the United States, residing in Grenloch, Camden county, New Jersey, have invented certain Improvements in Furrow-Covering Machines, of which the following is a specification.

The object of my invention is to provide a furrow covering machine with means whereby the proper action of the covering blades in returning the upturned earth to the furrow will be insured and the proper filling of said furrow from end to end thus effected. This object I attain in the manner hereinafter set forth, reference being had to the accompanying drawing, in which—

Figure 1 is a plan view of sufficient of a furrow covering machine to illustrate my present invention, and Fig. 2 is a rear view showing the parts constituting my invention in the relation which they bear to the furrow during the operation of the machine.

In the drawing, 1—1 represent the opposite covering or turning-in blades, whereby, as the machine is drawn forward, the earth upturned in forming the furrow is turned back into the same after the seeds have been deposited, these blades, in the present instance, consisting of disks rotatably mounted upon spindles 2, which are adjustably secured to the opposite end portions of a transverse bar 3, the latter being secured to a frame or yoke 4, which extends downwardly and rearwardly from the axle 5 of the machine, and is pivotally mounted, at its forward ends, in hangers 6 depending from said axle, the latter and its supporting wheels 7 being shown by dotted lines in Fig. 1.

The rear portion of the yoke 4 and its transverse bar 3 are connected, by links 8, to any suitable suspending and adjusting device, whereby the covering blades 1 are maintained in proper vertical position to act upon the banks of earth turned up on each side of the furrow, as indicated by dotted lines in Fig. 2, the yoke and bar thus serving as a carrier for the covering blades.

As furrows of different widths may have to be covered, the covering blades 1 are adjustable laterally on the spindles 2, the outer end of the hub of each blade bearing against a sleeve 12, which has a series of openings 13, to any one of which may be adapted the bolt 14, whereby the sleeve is secured to the spindle, lateral adjustment of the sleeve on the spindle being thus provided for.

In order to properly perform their intended function, the covering blades 1 should always be drawn forward in line with the furrow, since deflection of said blades to one side or the other will necessarily prevent the proper turning into said furrow of the banks of earth thrown up on each side of the same, the furrow being consequently left uncovered or only imperfectly covered where such deflection occurs.

To insure such right relation of the furrow-covering blades to the furrow, therefore, as the machine is drawn forward over the field, I locate in the furrow, in advance of said blades, a guide which, by engagement with the sides of the furrow tends to prevent any lateral deflection of the machine and thereby maintains the furrow-covering blades in their proper line of draft.

While many forms of guide adapted to run in the furrow and so connected to some member of the machine as to exert the desired lateral retaining influence thereon may be adopted in accordance with my invention, I prefer to use for the purpose a pair of rotating wheels or disks 9, mounted upon the blade-carrying member of the machine and engaging with the opposite sides of the furrow, as shown by the dotted lines in Fig. 2, whereby they will offer such resistance to lateral displacement as will tend to prevent deflection of the blade-carrying member of the machine to one side or the other to an extent sufficient to carry the covering blades out of position to engage with the banks of earth turned up at the sides of the furrow. These disks are preferably inclined in respect to the vertical so as to bear upon the sides of the furrow more directly than would such vertically disposed disks and each disk is properly mounted upon its respective member of the yoke 4 so as to bear a normally fixed lateral relation thereto, the means adopted in the present instance for effecting this result being an arm 10, secured, at its upper end, to said member of the yoke and carrying, at its lower end, the spindle upon which the disk 9 is mounted, said arm being rigidly retained in its proper position by means of a brace 11, extending from the arm to the side member of the yoke, as shown in Fig. 1.

Each member of the yoke 4 has a series of openings 15, to any one of which may be adapted the bolt 16, whereby the disk-carrying arm 10 is secured to said member of the yoke, and, in like manner, the yoke member has a series of openings 17 for the reception of the bolt 19, whereby the brace 11 is secured thereto, provision being thus afforded for effecting lateral adjustment of the disks 9, to suit different widths of furrow, or, if the brace 11 only is readjusted, for effecting change in the vertical position of said disks.

I claim:—

1. The combination, in a furrow covering machine, of a pair of covering blades, a carrier upon which said blades are mounted, said carrier having wheels which at all times support the carrier as it is drawn forward and a guide also mounted on said carrier and running in the previously formed furrow in advance of the covering blades.

2. The combination, in a furrow covering machine, of a pair of covering blades, a carrier upon which said blades are mounted, said carrier having wheels which at all times support the carrier as it is drawn forward and a pair of disks also mounted upon said carrier and each engaging with its respective side of the previously formed furrow in advance of the covering blades.

3. The combination, in a furrow covering machine, of a pair of covering blades, a carrier upon which said blades are mounted, said carrier having wheels which at all times support the carrier as it is drawn forward, a pair of disks also mounted upon said carrier and each engaging with its respective side of the previously formed furrow in advance of the covering blades, and means for adjusting said disks from and toward each other on said carrier.

4. The combination, in a furrow covering machine, of a pair of covering blades, a carrier upon which said blades are mounted, said carrier having wheels which at all times support the carrier as it is drawn forward, a pair of disks also mounted upon said carrier and each engaging with its respective side of the previously formed furrow in advance of the covering blades, means for adjusting the covering blades from and toward each other on said carrier, and means for adjusting the furrow-engaging disks from and toward each other on the carrier.

5. The combination, in a furrow covering machine, of a pair of covering blades, a carrier upon which said blades are mounted, said carrier having wheels which at all times support the carrier as it is drawn forward, a pair of disks also mounted upon said carrier and each engaging with its respective side of the previously formed furrow in advance of the covering blades, and means for effecting vertical adjustment of the disks upon the carrier.

6. The combination, in a furrow covering machine, of a pair of covering blades, a carrier upon which said blades are mounted, said carrier having wheels which at all times support the carrier as it is drawn forward, a pair of disks also mounted upon said carrier and each engaging with its respective side of the previously formed furrow in advance of the covering blades, means for effecting vertical adjustment of the disks upon the carrier, and means for adjusting said disks from and toward each other on the carrier.

7. The combination, in a furrow covering machine, of a pair of covering blades, a carrier upon which said blades are mounted, said carrier having wheels which at all times support the carrier as it is drawn forward, and a pair of disks also mounted upon said carrier and each inclined in respect to the vertical, each disk engaging with its respective side of the previously formed furrow, in advance of the carrier blades.

8. In a furrow covering machine, the combination of the covering blades, a suspended yoke upon which said blades are mounted, said carrier having wheels which at all times support the carrier as it is drawn forward, and disks mounted upon the side members of said yoke and serving, by engagement with the sides of the previously formed furrow, to prevent lateral deflection of the covering blades.

9. In a furrow covering machine, the combination of the covering blades, a suspended yoke upon which said blades are mounted, said carrier having wheels which at all times support the carrier as it is drawn forward, disks mounted upon the side members of said yoke and serving, by engagement with the sides of the previously formed furrow, to prevent lateral deflection of the covering blades, and means for adjusting the disks upon said side members of the yoke.

10. In a furrow covering machine, the combination of the covering blades, a suspended yoke upon which said blades are mounted, said carrier having wheels which at all times support the carrier as it is drawn forward, disks mounted upon the side members of said yoke and serving, by engagement with the sides of the previously formed furrow, to prevent lateral deflection of the covering blades, means for effecting lateral adjustment of the covering blades in respect to the yoke, and means for adjusting the furrow-engaging disks upon the side members of said yoke.

In testimony whereof, I have signed my name to this specification, in the presence of two subscribing witnesses.

FRANK BATEMAN.

Witnesses:
O. P. NEWCOMB,
E. E. WILSON.

Copies of this patent may be obtained for five cents each, by addressing the "Commissioner of Patents, Washington, D. C."